Aug. 7, 1934.  B. G. CAMPBELL ET AL  1,969,450
APPARATUS FOR CAPPING CONTAINERS
Filed Feb. 9, 1931   7 Sheets-Sheet 1

INVENTORS
Benjamin G. Campbell
Charles C. Wing
BY George Heath

ATTORNEY

Aug. 7, 1934.  B. G. CAMPBELL ET AL  1,969,450
APPARATUS FOR CAPPING CONTAINERS
Filed Feb. 9, 1931   7 Sheets-Sheet 2

INVENTORS
Benjamin G. Campbell
Charles S. King
George Heath
BY
ATTORNEY

Aug. 7, 1934.     B. G. CAMPBELL ET AL     1,969,450
APPARATUS FOR CAPPING CONTAINERS
Filed Feb. 9, 1931     7 Sheets-Sheet 4

INVENTORS
Benjamin G. Campbell
Charles C. Wirz
George Heath
BY
W. S. Graham ATTORNEY Aug. 7, 1934.  B. G. CAMPBELL ET AL  1,969,450
APPARATUS FOR CAPPING CONTAINERS
Filed Feb. 9, 1931   7 Sheets-Sheet 6
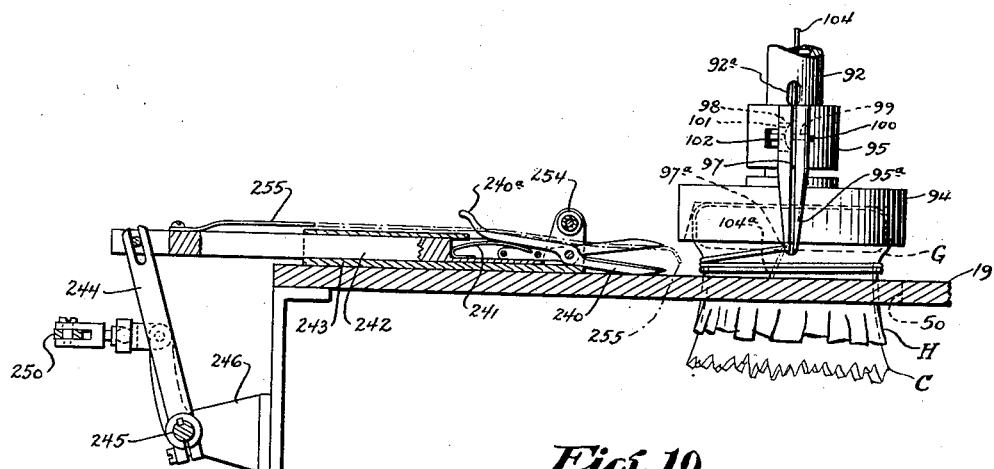
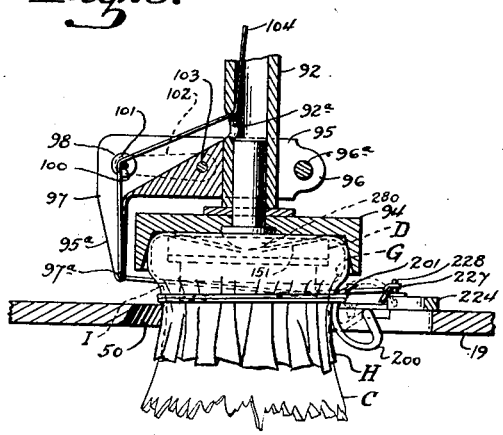
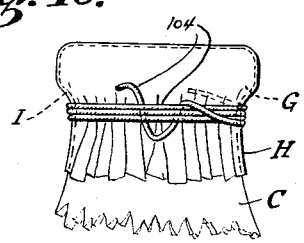

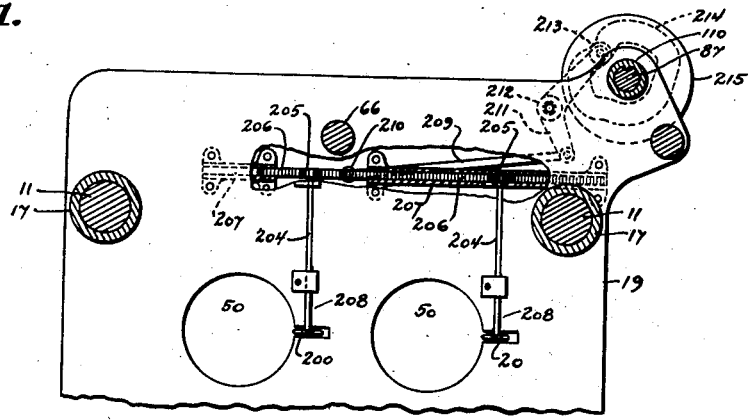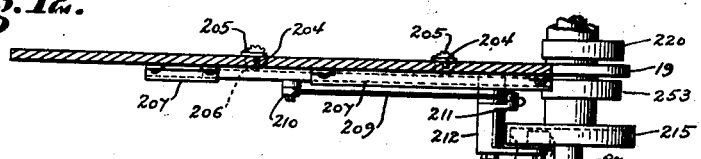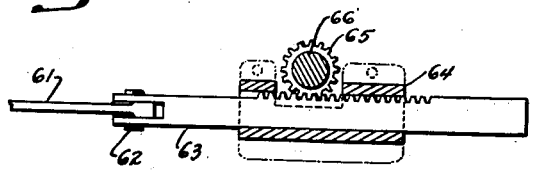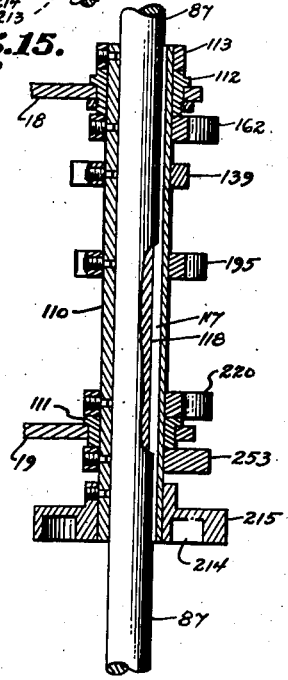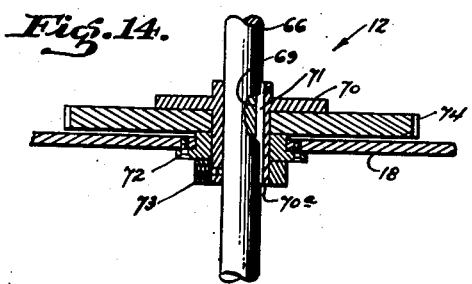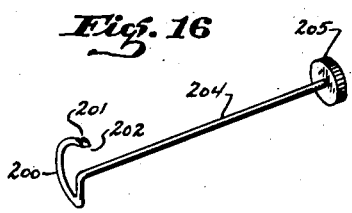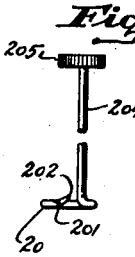

Patented Aug. 7, 1934

1,969,450

UNITED STATES PATENT OFFICE 1,969,450

APPARATUS FOR CAPPING CONTAINERS

Benjamin G. Campbell, Charles C. Wing, and George Heath, Oakland, Calif.; said Heath assignor to said Campbell and said Wing Application February 9, 1931, Serial No. 514,352

23 Claims. (Cl. 226—80)

This invention relates generally to protective skirted closures for bottles and containers, such as are commonly used commercially as milk bottles and the like, and to the apparatus for placing the covering on and securing it to the bottle, though the invention is equally adaptable to bottles and containers used for other purposes.

In Patent No. 1,762,506, dated June 10, 1930, to Benjamin G. Campbell, one of the inventors herein, such a skirted covering is shown, and a means for securing such closure to the bottle by means of a plurality of wraps of a flexible member around the skirt of the closure. Also in the co-pending joint application, Serial Number 412,712 of Benjamin G. Campbell and Charles C. Wing, there is disclosed a means and method of securing such a closure to a container without the use of knots or seals. The present invention relates more particularly to mechanical means to place wraps of a flexible cord around a skirted cap closure, securely position same, and sever the binding portion from the source of cord supply.

The milk bottle of the standard design is usually tapered or flared from the neck toward the base and is made so that at the neck there is provided a circular opening beaded circumferentially on the outer portion. A shoulder is formed on the inner side of the bottle wall adjacent the opening and usually about ⅜ inch down from the top of the bottle wall, making the opening at the shoulder slightly smaller in diameter than at the extreme upper portion. This shoulder is adapted to support a cardboard disc which has usually been previously treated with a non-absorbent material, such as paraffin, and pressed into the opening of the neck and onto the shoulder, forming a tight joint. When this disc is pressed onto the shoulder of the bottle, it leaves a space or cavity, allowing water, dirt or dust to accumulate thereon; furthermore, if the cap is slightly loose and the bottle is tilted from its normally vertical position, the milk will leak out, staying on top of cap, whereupon, when bottle is delivered by the dairy company, or other party, it appears unsanitary in their methods, also tending to attract cats, to lick the top of bottle unless it is placed in a protective box, or other protective means, upon delivery. Dust and other foreign unsanitary matter also settles upon the moist disc and when the disc is hurriedly removed, the foreign matter drops into the contents of the container.

The use of the skirted cap over the entire top of the container may entirely eliminate the use of the disc within the bottle neck, but the use of such disc closure is preferable on milk bottles.

While there are various methods employed for accomplishing the purpose of a closure for containers of the skirted type, they are expensive to manufacture and apply. For instance, in one method in common use the protective covering is made of heavy paper that has been treated with wax and in some instances shellacked. It is then cut into discs larger in diameter than the top diameter of the container, the outer peripheral edge then crimped and folded downwardly over the bottle top, forming an inverted cup. This cup is then secured by slipping a wire ring over the cup slightly above the lower edge and crimping or pinching the ring tightly around the covering or where a flexible tie member is used, soldering, or interlooping the ends, and sometimes sealing the end with fracturable wafers. These arrangements are expensive and inconvenient to remove.

One object of the invention is to provide mechanical means to position a skirted cap over an opening of a container and pass a flexible member around the skirt of the cap; other objects are to provide means whereby the ends of the flexible tie member may be mechanically positioned after passing around the container and frictionally held by the tie member; to provide synchronized means for severing the flexible member from a source of supply; to position containers to receive the closure member; to feed the closure members to the containers; to provide for applying the closures while the containers are in course of transit, though the container may be intermittently arrested in travel to perform certain of the operations, to provide for adjustability to containers of varying vertical height, and, generally, to improve upon the art of applying and securing such closures wherein the cooperating parts are so timed and synchronized that the various operations occur in proper sequence, and automatically without manual handling of the container or closure member.

While the drawings and description herein are made in respect to milk bottles, the invention is adaptable to tying operation on containers used for other purposes, and may be operated singly or in series or banks of one or several, but for purposes of definite illustration, two have been operatively connected herein.

In operating the invention, it is preferred to use, for the skirted cap, thin wax bond or parchment paper cut into circular discs of larger diameter than the bottle top, the disc being placed over the opening of the bottle top and having its peripheral portion folded downward around the outer surface of the bottle neck and secured by a flexible binder, such as wire, string or thread, wound around the portion of skirt folded below the bead around the upper portion of the bottle. The placing, folding and tying of the paper disc is accomplished in one complete mechanical cycle while the bottle is in course of transit through the apparatus.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein:—

Fig. 8 is an enlarged sectional view of scissors, ready to move forward to cut the string shown wrapped around the cap and bottle and held by the cord feed.

Fig. 9 is an enlarged sectional side view of the cord feed, paper holding cup and the needle for looping and securing the end of the string.

Fig. 10 is an enlarged plan view of the vice and string holding lever.

Fig. 11 is partial plan view of the needle rotating mechanism and the actuating cam.

Fig. 12 is a side view, partly in section, of the plan view of Fig. 11.

Fig. 13 is an enlarged detail plan, partly in section, of rack drive for the intermittent movement of actuating mechanism shown in Fig. 4.

Fig. 14 is sectioned horizontal view of cord feed actuating mechanism. (See plan view in Fig. 4.)

Fig. 15 is vertical section of standard mounting movable sleeve having mounted thereon cams to actuate the various mechanisms.

Fig. 16 is perspective of needle by which the means are positioned.

Fig. 17 is a broken plan view of needle shown in Fig. 16.

Fig. 18 is elevation of neck portion of bottle showing skirted closure positioned thereover, with frictionally held ends of tie member turned to the front, which in Fig. 9 is that portion of the bottle adjacent the arcuate needle end.

In order to more fully understand the invention, reference is made to the accompanying drawings, wherein like characters of reference indicate corresponding parts.

The bottle, generally indicated C, is of well known type having open end D provided with an internally recessed shoulder E adapted to receive a well known type of relatively stiff cardboard closure disc F, and having an external circumferential bead G.

Figure 1:
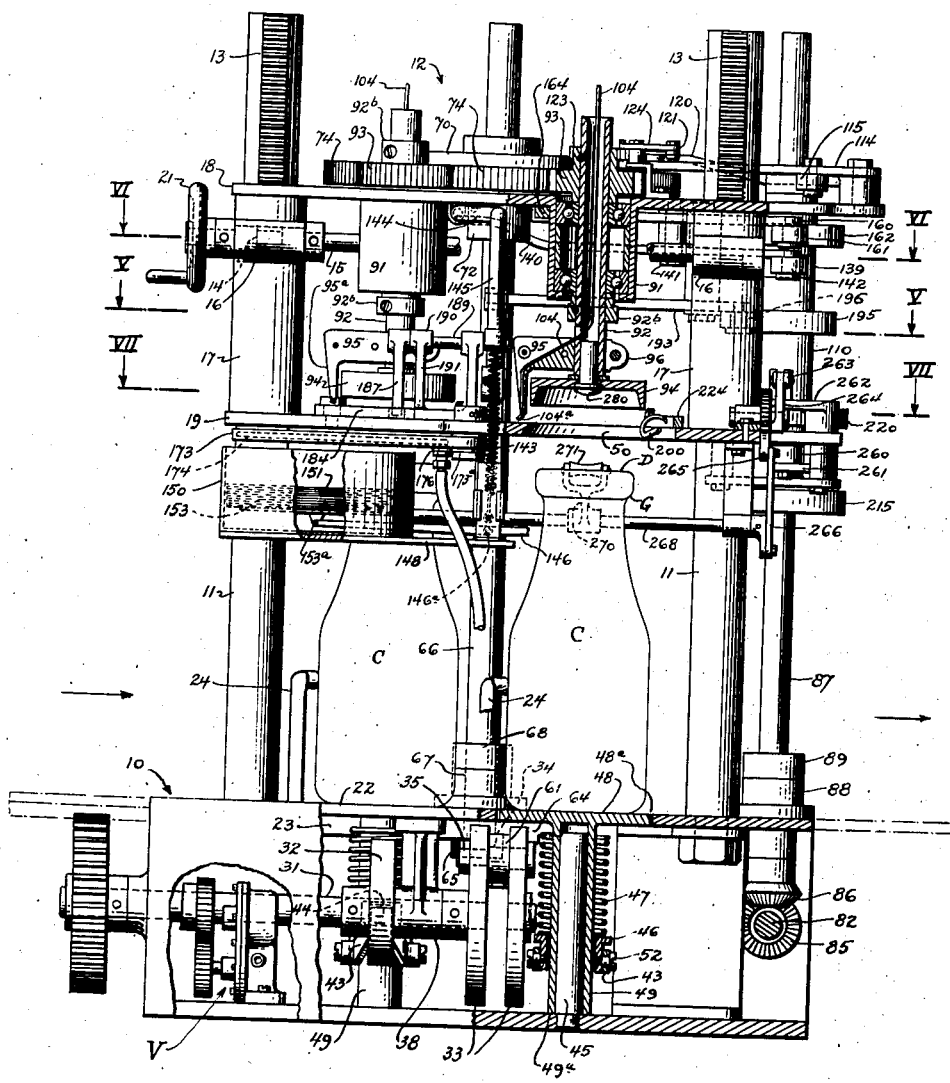
Fig. 1 is a front elevation of the machine partly in section.
Figure 2:
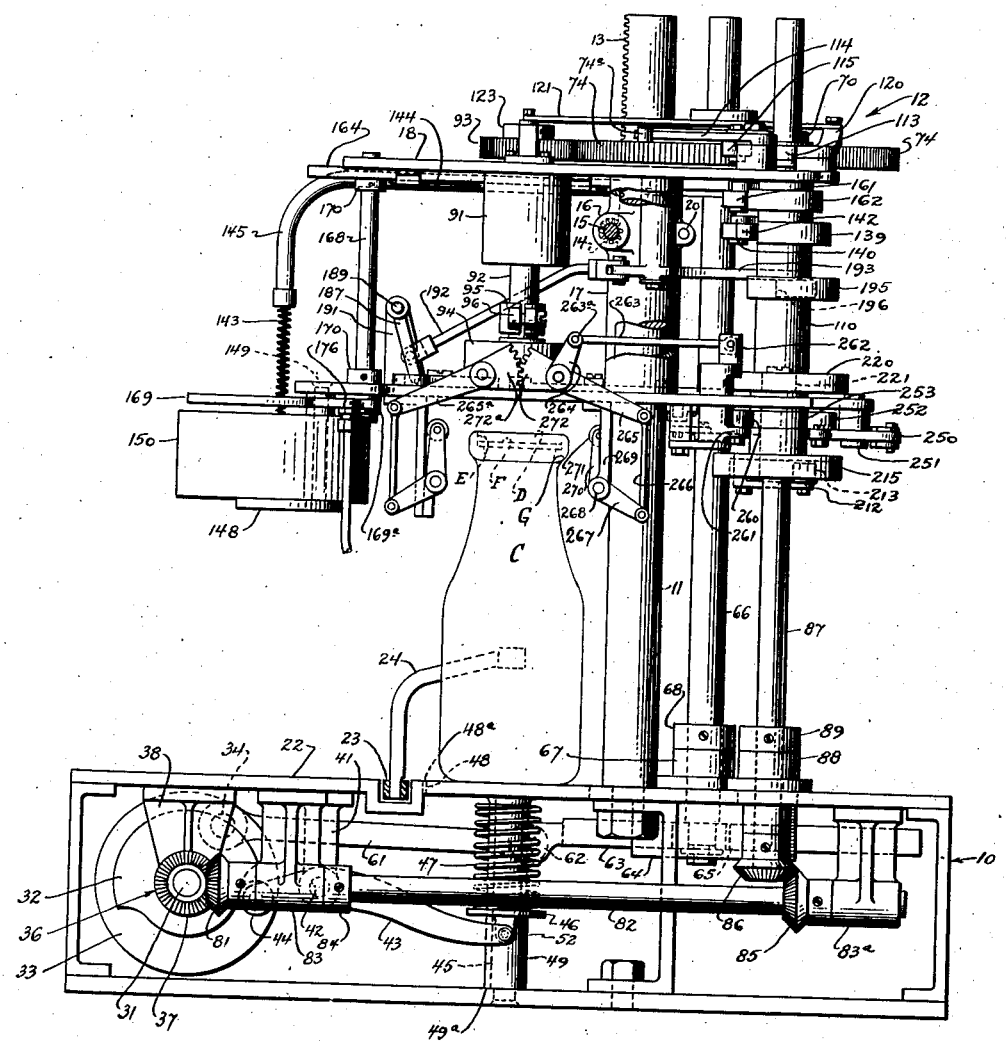
Fig. 2 is a side elevation looking toward a bottle entering the device and showing the bottle-centering means, when bottles are in raised position.
Figure 3:
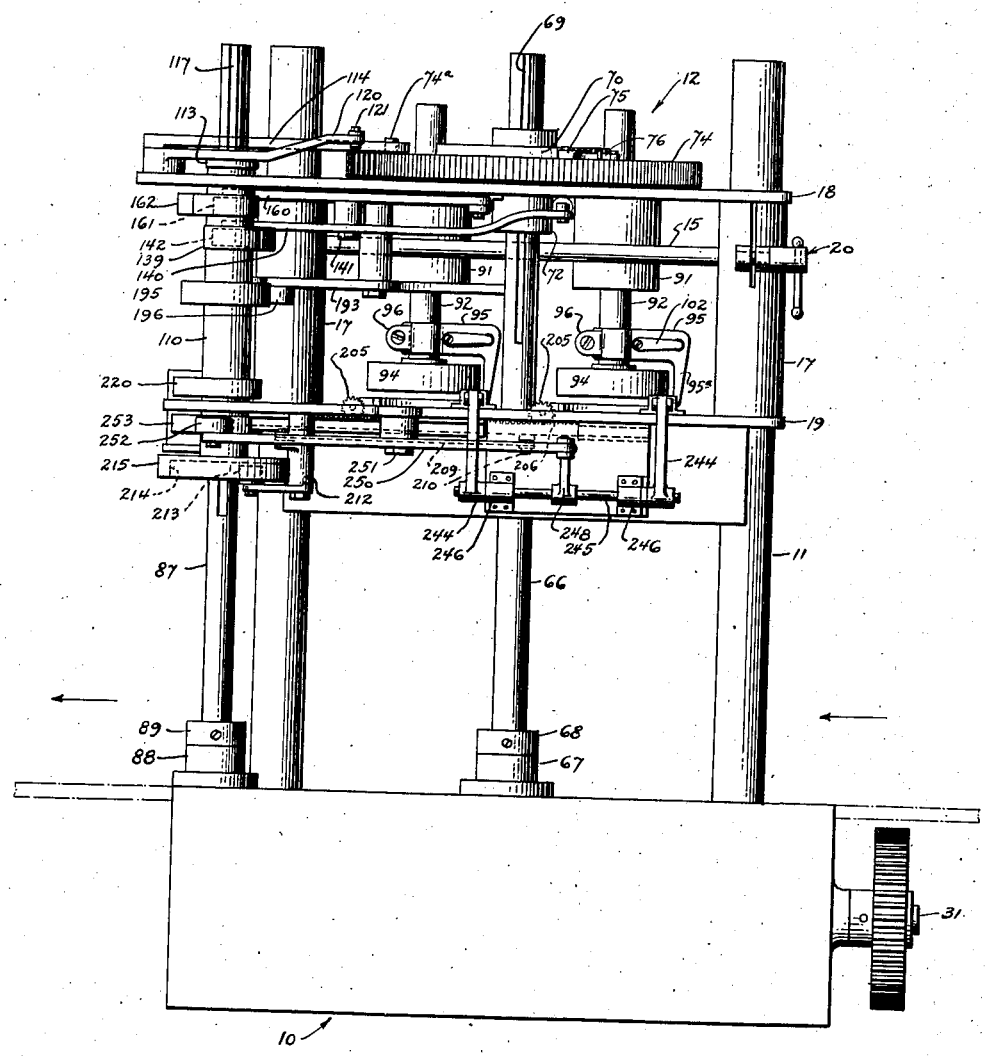
Fig. 3 is a rear elevation.

Reference being had particularly to Figs. 1, 2 and 3 of the drawings, a base member 10 supports two vertically disposed columns 11—11 on which driving head mechanism, generally indicated 12, is slidable vertically. The columns 11—11 are formed at their upper portions with a rack 13; and this rack intermeshes with teeth 14 which are formed in shaft 15, the latter being mounted in bearings 16 formed on the upper end of the two tubular cross-heads or sleeves 17, these cross-heads 17 being vertically slidable on the columns 11, and are also connecting means for the upper plate 18 and lower plate 19, of the driving head 12. On the rear side of one of the cross heads 17, or both, is mounted a locking or clamping means, such as shown at 20 on Figs. 3 and 6. Secured on the shaft 15 is hand wheel 21 for raising or lowering of the head 12.

Driving means are provided by a rotatable shaft 31 which is actuated by any suitable power, but preferably by the machine that fills the bottles, said drive being so timed and arranged as to deliver one bottle at each riser plate 48 upon each complete cycle of operation of the apparatus. Any well known means may be used to propel the bottles, such as an intermittently moving conveyer belt 23 having arms 24 to engage the bottles.

Cams 32 are fixedly mounted on and rotate with the shaft 31 and thereby vertically reciprocate the riser plates 48 which are the bottle raising means. Also mounted to rotate with the shaft 31 are a pair of discs 33 which are secured in spaced relation and cause to rotate in unison by a crank pin 34 and nut 35. This crank pin 34 is the driving mechanism for driving the cord feed, which will hereinafter be explained.

Mounted on and rotated in unison with the shaft 31, as at 36, is a bevel gear 37 which through a shaft 82 and bevel gear 86, is the driving means for the cams mounted on the vertical rotatable shaft 87, which will be presently described. The shaft 31 is rotatably journalled in bearings 38 secured under the upper plate 22 of the base member 10, one of said bearings being shown in Fig. 1.

On bearing 41 a lever 43 is pivotally mounted by pin 42, one end of the lever 43 rotatably mounting cam roller 44 which contacts with the cam 32; the opposite end of lever 43 is forked so as to straddle the guide post 49. The forked end of the lever 43 is pivotally secured, as at 52, to a plate 46 upon which a compression spring 47 is secured. When the cam 32 is rotated and thereby depresses the adjacent end of lever 43, the forked end of said lever is raised and thereby the spring 47 engages with the riser plate 48, upon which the bottle rests. This plate 48 has secured on its lower side a tubular guide 49, which is slidably mounted on the vertically disposed guide column 45, the lower end of the guide 49 normally resting upon the lower plate of the base member 10, as at 49ª. The plate 48 is always in the same horizontal plane with the upper plate 22 of the base member 10 as at 48ª when the bottles are being positioned in the apparatus, but raises during the capping operation so as to pass the beaded neck of the bottle through openings 50 and to the inverted cup of depressor 94. It is to be understood that the intermittent movement of the conveyor belt 23 and arms 24 is properly synchronized so that said belt ceases to move the bottles during the capping and tying operation.

There being two bottles capped at each cycle of operation in the exemplification herein, and as the respective operations are identical, explanation of one will suffice, though reference will be made to coacting parts of both units.

Rotatably secured on the crank-pin 34 is a connecting rod 61 having its opposite end pivotally secured, as at 62, to a reciprocable rack bar 63 which is slidably mounted in guide 64 secured to the under side of the upper plate 22 of the base member 10. The rack bar is provided on one side with teeth which mesh with a pinion 65. This pinion 65 is fixedly secured to a vertically disposed shaft 66 rotatably mounted on the lower bearing 67 and secured by collar 68 against any vertical thrust. The shaft 66 is actuated to rotate clockwise and counter-clockwise, respectively, by the reciprocation of rack bar 63. The upper end of the shaft 66 has a keyway 69 formed therein. This keyway 69 is of sufficient length to allow a disc clutch 70 to slide vertically of shaft 66, according to the height of bottle to be capped. (See Fig. 4.) Therefore, the clutch 70 is adapted to vertical movement with driving head 12, and the clutch 70 will always rotate with the shaft 66 by means of key 71 engaging keyway 69.

The clutch 70 has a hub 70ª and is rotatable in a bearing 72 mounted on the under side of the upper plate 18 of the driving head 12 and is also secured against up or downward thrust by the collar 73, secured to the lower end of the clutch hub 70ª. Free to rotate on the hub 70ª is a gear 74 which normally is at rest relative to the rotation of shaft 66 and clutch 70.

On the upper face of the gear 74 (see Figs. 3 and 4), a pawl 75 is pivotally secured which contacts the peripheral edge of the clutch plate 70 by spring 76. A notch 77 is formed in the peripheral edge of the clutch plate 70, which is engaged by the pawl when rotation is imparted clockwise to the clutch by the shaft 66 and thus will cause the gear 74 to rotate, whereas upon rotation of shaft 66 counter-clockwise, the pawl will by-pass the notch and gear 74 will remain at rest. Thusly, the reciprocation of rack bar 63, though its movement is continuous, indirectly imparts intermittent rotation to gear 74 which in turn meshes with pinions 93, for purposes hereafter described.

The shaft 31 (see Fig. 2), has a bevel gear 37 secured thereto, which meshes with a similar bevel gear 81 secured to a shaft 82 rotatably mounted in bearings 83 and 83ª secured to the under side of the upper plate 22.

Collars 84 are secured to this shaft 82 to eliminate end thrust caused by rotating the bevel gears.

Fixedly mounted to the opposite end of the shaft 82 is a second bevel gear 85 meshing with a similar bevel gear 86, the latter being secured to the lower end of the vertically disposed shaft 87, which is rotatably mounted in the bearing 88 secured to the upper plate 22 of the base member 10, collar 89 being secured to the shaft 87 to eliminate any vertical thrust. The shaft 87 carries a slidable sleeve on which the cams are mounted for actuating the mechanism for placing and securing the cap to the bottle, which will hereinafter be explained. (See Fig. 15.) The cord feed mechanism will now be explained, and as there are two shown on the accompanying drawings, both operated and made the same, explanation of one will suffice.

Mounted to the under side of the upper plate 18 of the driving head 12 is an anti-friction bearing, as shown at 91, and rotatably mounted in this bearing is a tubular shaft 92. Shaft 92 has secured on its upper end a gear 93 which meshes with the floating gear 74 rotatably mounted on the clutch hub 70ª. When rotation is imparted to the gear 74 by clockwise rotation of clutch plate 70 and the pawl 75, rotation will be caused to gear 93 and to hollow shaft 92, the latter having freely mounted on its lower end so as to be independent of rotation with shaft 92, an inverted cup-shaped closure depressor 94, which causes the closure disc to be formed downwardly at its radial outer portions over the outer edges of the bottle neck when the bottle is raised by the plate 48, as above described, with its neck through opening 50 of lower plate 19.

Secured to and rotatable with the hollow shaft 92 above the depressor 94, is the cord feed arm 95, which is adjustable vertically upon the shaft 92 by loosening of the clamp 96 by the screw 96ª. Extending radially outwardly from the shaft 92, the cord feed arm is formed with a downward extension or tongue 95ª to a point adjacently above the upper part of the lower plate 19 of the driving head 12. The arm 95 and tongue 95ª have a slot 97 formed therein, which slot has a small opening 97ª forming an eye. A tie member, preferably a flexible cord 104 passes from a source of supply (not shown), through the slot and eye, and is best shown in Figs. 8 and 9.

A tension to the cord is provided and as exemplified consists of a small cup-shaped plate 101 mounted on spring 102 which is secured to the cord feed arm by adjusting pin 103, an opening 98 being provided through the arm wall to receive the plate 101, which is mounted on a pin 100, which is guided by an opening 99 in the opposite arm wall. The pin 100 also acts as a guide over which the cord 104 passes and vertically aligns the cord with the eye 97ª.

The tie member or cord 104 feeds from a freely running source (not shown), through the hollow shaft 92, and through the opening 92ª in said shaft, and thence over the tension device 101, in the slot 97, and then down in the slot 97 to and through the eye 97ª. Thrust collars 92ᵇ are mounted on the shaft 92 to eliminate vertical thrust.

Reference being now had to Figs. 1, 2, 3 and 4 of the drawings:—

When the rack bar 63 is reciprocated, it rotates the pinion 65 and vertical shaft 66, and thereby rotates the clutch 70 one revolution alternately, in one direction clockwise, and then in the opposite direction counter-clockwise. In this operation, motion imparted in clockwise direction will cause the gear 74 to rotate one revolution clockwise by engagement of pawl 75, while on the counter-clockwise revolution of clutch 70 the gear 74 will remain stationary.

Mounted on the cam shaft 87 is a cam sleeve 110 (see Fig. 15). This cam sleeve is provided with a key 117 which is vertically slidable in keyway 118 and is rotatably mounted in bearings 111 and 112 recessed in the upper and lower plates of the driving head 12, thus providing for vertical movement of the cam sleeve on shaft 87, and rotation thereby.

Figure 4:
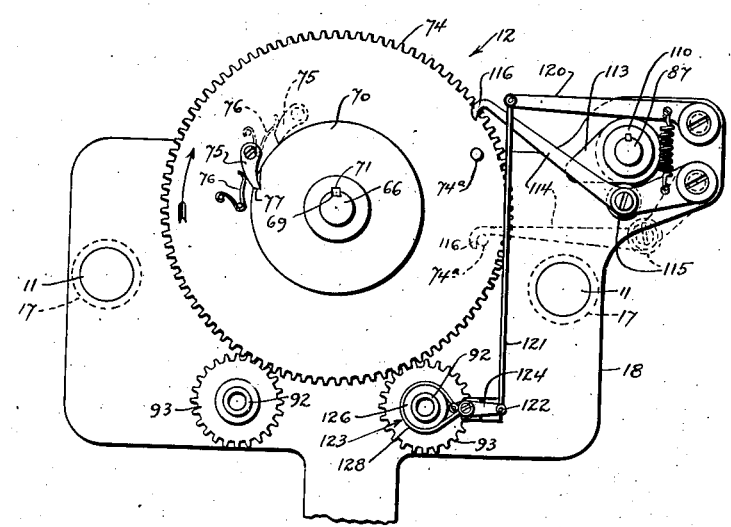
Fig. 4 is a plan view, showing the driving, tripping mechanism for rotating the cord feed and also the braking and locking means and the cam for operating the same.

The action of the cams is so synchronized that when the bottle has been raised by the riser plate 48, responsive to cam 32 so that the bead G lies within cup 94, the cam 113 will release the lever 114 from the pin 74ª just prior to the engaging of notch 77 in the clutch plate 70ª with the pawl 75. The lever 114 is pivotally secured on the upper plate 18 and pivotally mounts a roller 115 which is engaged by the cam 113. The lever 114 is formed with a hook 116 at the free end which is formed so as to releasably hold the pin 74ª although the cam 113 is clear of the roller 115 on the lever 114 and when movement is imparted to the gear 74 in the direction of the arrow, will tend to release the hook 116 from the pin 74ª. This locking means is also intended to eliminate any back lash between the clutch 70 and the gear 74, caused by friction of both parts when the clutch is rotated in the opposite direction to the arrow, as shown in Fig. 4.

A braking means to prevent coasting of the mechanism because of momentum is provided which in the preferred embodiment comprises a second lever or brake lever 120, which is pivotally mounted at one of its ends on the upper plate 18 and is arcuately actuated once on every revolution of the cam 113. At its opposite end the brake lever 120 has pivotal connection with a link 121 which in turn is pivotally secured, as at 122, to braking means 123, of any suitable construction, such as fulcrum levers 124, pivotally secured to the rod 121, and a brake band 128 circumferential of a brake wheel 126 secured to the gear 93. When the cam 113 engages the lever 120 a twisting action will be caused to the levers 124 and the band 128 will be tightened around the brake wheel 126, thereby holding gear 93 and shuttle 95 at a fixed position.

Figure 6:
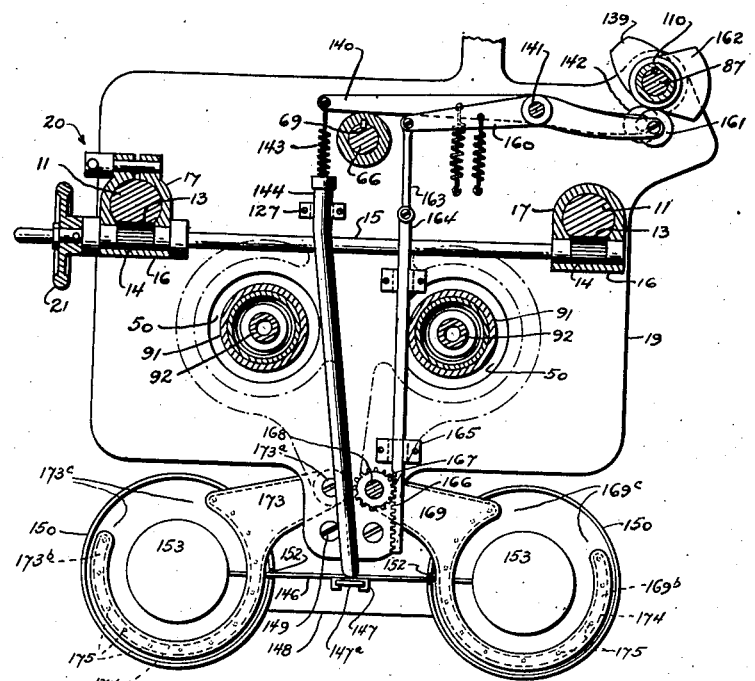
Fig. 6 is a plan section taken on line VI—VI of Fig. 1, showing the paper raising mechanism, the vacuum feed, which places the paper disc over the bottle and their respective cams; also the mechanism for raising the entire driving head for the different heights of bottles.

Referring now to the disc cap raising means and feeder, as shown best on Figs. 1, 2 and 6 of the drawings, there is pivotally secured to the under face of the upper plate 18 the disc raising lever 140 having cam roller bearing 142, and the disc feeder lever 160 having cam roller bearing 161 and both levers pivotally mounted centrally on the same pin 141. The disc raising lever 140, is pivotally actuated at one end by cam 139 and is connected at its opposite end to a coil spring 143, which is disposed longitudinally within a tubular housing 144, which is disposed laterally transversely parallel with the under face of the upper plate 18 and is secured thereto by plate 127, and thence depends downwardly, as at 145, to slidingly guide the spring 143 to a connection with balance bar 146, which is centrally pivoted to a plate 147ª which is vertically reciprocable in a guide 147. Mounted in spaced relation to the underside of the lower plate 19 by suitable means, such as bolts 149, is a plate 148, which supports on each of its outer ends a cup-like container 150 for holding in superposed stacked relationship a supply of paper discs 151 which are of larger diameter than the opening D of the bottle C, providing a portion which forms a skirt H externally circumferential of the bottle neck. A supply of the paper discs are placed in each of the containers 150.

The containers 150 are vertically slotted on one side wall, as at 152, and so placed that the slots 152 will be opposingly faced and adapted to receive therein and guide in vertical reciprocation an end portion of the centrally pivoted balance bar 146, as at 146ª, said bar having at each end a circular plate 153 pivotally mounted, as at 153ª, upon which the paper discs 151 rest. The paper discs in both containers are raised by the rotation of the cam 139, thence the roller 142 and the lever 140, the spring 143, the balance bar 146, and as the cam will always move the lever to a limited point, the tension of spring 143 will compensate for any variations in the amount of the paper discs in the containers when the discs are raised to the delivery arms 169 and 173 hereafter described, and the central pivoting of the bar 146 and pivoting of plate 153 compensate for differences in the amount of paper disc in the several containers.

The paper disc feed or delivery mechanism will now be explained:

Mounted pivotally on the pin 141 and preferably above the paper raising lever 140 is a second lever 160, having mounted on one end a roller 161 which is actuated by rotation of cam 162 which is secured to and rotates with the sleeve 110. The opposite end of the lever 160 is pivotally connected to a link 163 which is in turn pivotally secured to one end of bar 164 horizontally and slidably mounted laterally transverse of the under face of the upper plate 18 by clips or guides 165. The opposite end of this bar 164 is formed with a rack 166 with teeth in mesh with the pinion 167 secured to and thereby rotatable with the upper end of the vertically disposed shaft 168 which is axially rotatable in bearings formed in the upper plate 18 and lower plate 19 of the driving head 12, and is held against vertical thrust by suitable collars 170 secured to the shaft. To the lower end of shaft 168 is fixedly secured a paper disc delivery arm 169, preferably hook-like or sickle shaped, and the hub portion 169ª is partially formed with gear teeth 171 which mesh with similar gear teeth 172 of a similar coacting delivery arm 173 which is pivotally mounted on plate 19 by bolt 173ª. Both arms are similar in operation and construction, arm 169 being operated in a counter-clockwise direction while arm 173 is operated in a clockwise direction when the paper discs are fed, one by each arm, from the container under openings 50 and over the bottle top. The arms 169 and 173 extend radially outward from their respective hubs terminating preferably in shape of a hook or sickle, as shown at 169ᵇ and 173ᵇ on Fig. 6, providing gaps 169ᶜ and 173ᶜ, which permit the arms to pass free of the bottle neck and return to their normal position overlying containers 150. (See Fig. 6.) These hook-shaped members 169ᵇ and 173ᵇ have substantially the same peripheral diameter as the paper discs 151, and when at rest are directly over the containers 150. The arms 169 and 173 and the hook members 169ᵇ and 173ᵇ are made hollow, forming a chamber, as indicated at 174 by dotted lines in Figs. 1 and 6, and small openings 175 are drilled in the under face thereof.

Connected with each of these chambers, preferably adjacent the hub so as to minimize the arc of movement, is a flexible vacuum tube 176, which leads to a suitable vacuum suction means of any suitable well known type, indicated generally V in Fig. 1, which may be actuated from the main shaft 31, or by any suitable motive power.

The flexible tube 176 is in direct communication through chamber 174 with the small holes 175, so that when the paper discs 151 are raised by ever 140, spring 143 and balance bar 146, the uppermost disc in the respective containers 150 will be held by suction against the underside of the delivery arms 169 and 173, and only one disc at a time will be delivered to each bottle. When the cam 162 actuates the bar 164, the teeth 166 being in mesh with the pinion 167, will cause the shaft 168 to axially oscillate. This will cause the hooks 169$^b$ and 173$^b$ of the vacuum arms to move inwardly under the openings 50 and over the openings D of the bottles and under the inverted cup 94 and will be held in that position while the bottles are raised, and the paper discs are thereby pushed upwardly through the hooked arms and the holes 50, thus forming the skirt H around the bottle neck, while the central portion of the disc covering the opening D is crimped into a close fit by the cup 94. The vacuum arms are now returned to their original position by opposite reciprocation of shaft 164 by lever 160 actuated by cam 162, leaving the bottle in raised position, as in Fig. 9.

On the upperside of plate 19 (see Fig. 5 and Fig. 10), a guide 180 is provided between an upstanding inner wall 181 and outer wall 182. Adjacent the guide is mounted on plate 19 an arm 184 pivoted at 185 and having a spring tension 186 to accelerate its action and provided at its free end with teeth 183, which are adapted to engage the inner wall 181. The arm 184 is caused to pivotally oscillate by lever 187 which has one end engaged in socket 188 (see Fig. 10), and has mounting at its other end on a cross bar 189 which is pivotally mounted in bearings 190 of standards 191, the lever 187 being caused to oscillate by connecting link 192 pivoted at one end to lever 187, and pivoted at its other end to bell-crank lever 193 which fulcrums on pivot 194 and is actuated through roller bearing 196 by cam 195, which is mounted on and rotates with the cam sleeve 110.

A needle 200, best shown in Figs. 9 and 16, is provided for looping an end of the cord 104 under the wrappings thereof circumferential of the skirt H around the bottle neck (see Fig. 18). The needle is substantially arcuate, and preferably has its point hooked, as at 201, and bent slightly out of alignment with the plane of the arcuate portion, as at 202, (Fig. 17). The arcuate portion of the needle is supported by a shank 204 and is preferably of resilient material, as spring metal, so that the needle will not be snapped by striking the bottle which is in transit through the machine. At the end of the shank opposite the arcuate needle is mounted a pinion 205 which meshes with a rack bar 206 which reciprocates beneath plate 19, and thereby rotates the shank 204 in the guides 207, (see Figs. 11 and 12), plate 19 having a flared slot as at 208 (Fig. 7) to permit the rotation in the plane of plate 19 of pinion 205, and shank 204, and the rotation of the arcuate needle 200 substantially on its radial axis. The reciprocation of the rack 206 is accomplished by an arm 209 having pivotal connection therewith, as at 210, said arm in turn having pivotal connection with one arm of a bell-crank 211, which is pivoted on bearing 212, the other arm of the bell-crank having roller bearing 213 which rides in the track 214 of internal cam 215 which is mounted upon and rotates with cam sleeve 110.

Figure 5:
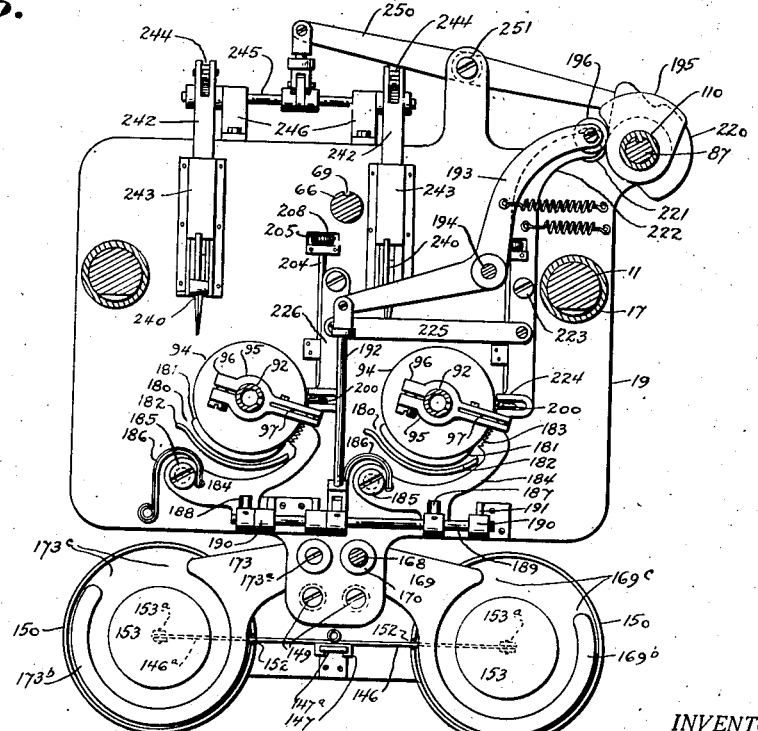
Fig. 5 is a plan in section taken on line V—V of Fig. 1, showing the vice, the lever for holding one loop of the string and their respective actuating cams. (The vertical standards are shown in section.)

Means are provided whereby a portion of the cord 104 is maintained in spaced relation to the bottle neck during the process of positioning the wraps around the skirt of the cap, and for this purpose a cam 220 is mounted upon and rotates with cam sleeve 110, which contacts, through roller bearing 221, a lever 222 pivoted centrally of its length, as at 223, on plate 19, and having its free end 224 of substantially U-shape so as to lie on both sides of needle 200 (see Figs. 5, 9 and 10). Second lever 226 in similar relation to a second needle may be operated through a connecting link 225 in which case the second lever may be pivoted to the plate 19 at a suitable point without direct contact with the operating cam 220. Upon the arms of the U-shaped lever end are provided means, such as a hook 227 and pin 228 to hold the cord thereon when the lever end 224 is drawn away from the bottle neck.

Shearing means are provided (see Fig. 8) to sever the cord 104 from a continuous source of supply (the latter not shown). The severing means may be of any suitable type, such as an incandescent electric resistance wire, or a sharp blade, but in the preferred embodiment herein is illustrated and described as a pair of shears or scissors 240 which may be of a well known type having a spring 241 disposed between the handle portions so as to normally maintain the shearing blades open, as shown in Fig. 8. The shears are mounted upon a bar 242 which reciprocates in guides 243, the reciprocation of said bar being accomplished by a lever 244 which is keyed to a cross bar 245, suitably journalled in bearings 246. The bar 245 fixedly mounts lever 250 which is fulcrumed on pivot 251 on the plate 19, the opposite end of the lever 250 having roller bearing 252 on cam 253 mounted on and rotatable with cam sleeve 110.

Figure 7:
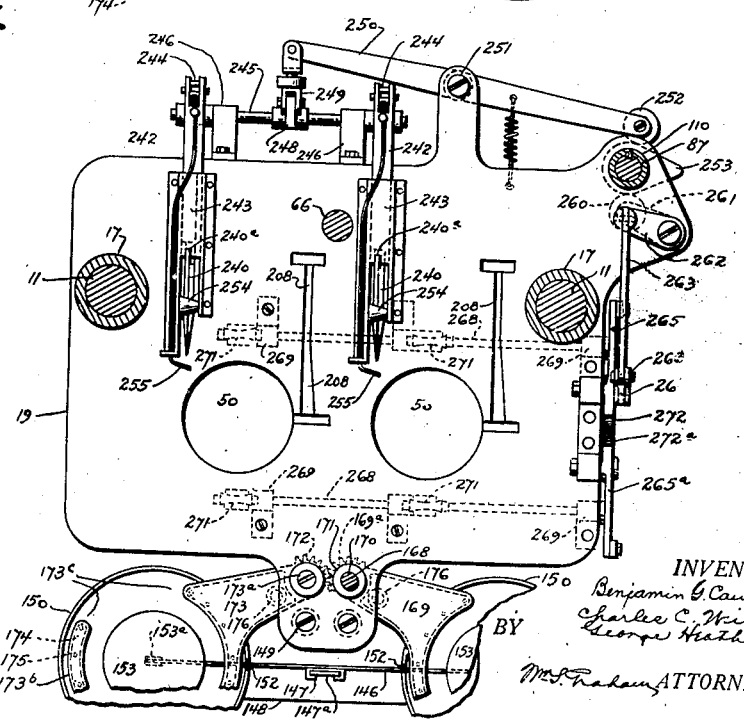
Fig. 7 is a partial plan section taken on line VII—VII of Fig. 1, showing the cam and levers for operating both the scissors and bottle centering means.

Obviously, the shearing means is so positioned that when the cord has been wrapped around the bottle the desired number of times, the scissors 240 will sever the cord from the source of supply. This is accomplished by the cam actuated reciprocation of the bar 242 advancing the scissors which in turn impinges the scissors handle 240$^a$ against a fixed stop member 254 which presses the handle 240$^a$ downward and closes the blades on the cord. The stop member 254 preferably is tapered as shown in Fig. 7 so that a twisting pressure is imparted to the scissors handle to cause the blades to make a sharp cut on the cord. The cord is cut a short distance from the eye or hole 97$^a$ of the arm portion 95$^a$, so as to leave a free leading end 104$^a$ approximately one-fourth inch long extending from the said hole. This leading end is gripped by the teeth 183 of vice 184 upon the next succeeding cycle of operation. Since it is frequently desired to use waxed or stiffened cord, a finger 255 cooperates with the scissors to turn the free end of the cord downward so that it will travel in guide 180 to the point of engagement of the vice teeth. The finger 255 is mounted on and reciprocates with bar 242 and extends forwardly of the scissor blades so that practically simultaneously with the severing of the cord the finger strikes the free leading end extending from hole 97$^a$ and bends it downward.

Bottle centering means are provided so that the bottle will be properly aligned to receive its cap while passing through the apparatus. It will be readily realized that to be commercially practical the apparatus must be capable of handling and capping bottles at a high rate of speed. A bottle while in transit is filled and has the additional weight of the contents thereof. The momentum of the filled bottle might cause a slippage or tilting thereof upon the intermittent cessation of propulsion of the bottle by arm 24 when the bottle is upon riser plate 48 and the longitudinal movement is suddenly changed to vertical movement for the capping operation. Such slippage or tilting, or possible overturning of the bottle must be avoided, and the bottle must be properly aligned with and guided to the hole 50 and cup 94. Therefore, a centering means is highly desirable. The centering means (see Figs. 2 and 7) operates from the cam 253 which oscillates a crank arm 261 through roller bearing 260, said arm having fixed connection through a bearing in plate 19 with a synchronously oscillating arm 262 which has pivoted connection to a rod 263 and reciprocates same, said rod 263 having pivoted connection at 263a to a rocker arm 264 which is fixedly connected to a centrally pivoted lever 265. One arm of the lever 265 has hinged connection to a link 266 which at its opposite end has hinged connection to a lever 267 which is fixedly mounted to and axially rotates a shaft 268 which is journalled in bearings 269 suitably mounted upon plate 19.

The bar 268 fixedly mounts arms 270 which have at the end thereof rollers 271. The lever 265 (see Fig. 2) has at one end a rack 272 which intermeshes with a similar rack 272a on a similarly operating lever 265a which in turn operates, in the manner above described, a complementary centering mechanism on the opposite side of the bottle. Upon cam actuated reciprocation of bar 263, the rollers 271 are brought into contact with the side of the bottle and as the bottle is raised the rollers ride down the bottle wall so as not to interfere with the skirted portion H of the paper cap, nor the windings of the tie member therearound.

The mode of operation is as follows:—The cord feed 95 in Figs. 1, 2 and 3 is in position at the end of a complete cycle of operation just subsequent to the severing of the cord 104 from its source of supply and with free leading end portion 104a depending from the hole 97a. This may be called a starting position, at which moment the pin 74a and pawl 75 and lever 114 are at the positions shown in full lines in Fig. 4. The cam 113 then moves lever 114, the shank of which contacts pin 74a, and as the lever is moved forward, the gear 74 is rotated clockwise, independent of clutch 70, a portion of a revolution to the position shown in dotted lines in Fig. 4, at which point the revolution ceases as the cam point passes the roller 115, and the coasting of the gear 74 beyond a certain predetermined point is prevented by pin 74a engaging hook 116. This partial rotation of gear 74 has rotated gears 93 which rotate the shafts 92 and thereby the cord feed 95, and the cord feed has been moved to the position shown in Fig. 5 adjacent the needle, at which moment the cam 195 has ceased to actuate vice 184 outwardly and the spring 186 snaps the teeth 183 of the vice into contact with inner guide 181, thereby gripping the leading end 104a of cord 104 which has been trailed by the cord feed arm 95 through guide 180.

Having reached this point, the cord feed presently rests during a brief period of time that the rack bar 63 is reciprocated rearwardly, rotating the shaft 69 and clutch 70 counter-clockwise, which does not engage the pawl 75 and therefore does not rotate gear 74, any unintended frictionally actuated movement of gear 74 being now prevented by brake 128 actuated by cam 113 which has now contacted the lever 120.

During this counter-clockwise rotation of clutch 70, a bottle has been placed on riser plate 48 by arm 24, cam 139 has raised the paper disc scales 146, the arms 169 and 173 have, by vacuum, picked up the top paper disc from each container and the cam 162 has actuated the same arms inwardly so as to position a paper disc over each bottle, the riser plate actuated by cam 32 has raised the bottle's neck through the arcuate portions 169b and 173b and thereby placed the paper disc over the opening of the bottle neck with the outer peripheral portion pressed downwardly to form skirt H, after which the arcuate arms 169b and 173b will have retrieved to their normal positions over containers 150 upon cessation of the actuation by the cam 162.

The bottle has been vertically elevated by the riser plate through hole 50 until the bottle opening D and bead G lie within the recess of the cup 94, the skirt being maintained in position by the edges of hole 50. Meanwhile the cam 215 has, through rack 206, rotated shank 204 and thereby rotated the arcuate needle 200 on its axis so that the shank of the needle adjacent the hooked point 201 lies against the skirt H, as shown in Fig. 9.

The cam 220 and its complementary spring on lever 222 are so timed and arranged that simultaneously with this forward movement of the needle shank against the skirt, the U-shaped end 224 of the lever 222 with hook 227 and pin 228 is actuated into substantial contact with the skirt with its arms on the two sides of the needle.

At this point, the forward reciprocation of rack bar 65 commences, responsive to rotation of discs 33, and this movement rotates the shaft 69 and clutch 70 in a clockwise direction whereupon the notch 77 engages the pawl 75 and simultaneously rotates gear 74, the brake 128 and the hook 116 having been released from action of cam 113. The gear 74 now rotates the spurs 93, and the arm 95 rotates counter-clockwise around the skirt H, the cord 104 feeding out through hole or eye 97a under a tension created by spring member 102, thus providing for tight wraps around the skirt.

The cord lead end 104a continues to be held by vice 184. The arm 95 feeding out the cord passes over the U-shaped member, with the hook and pin (227 and 228) and also the needle 200 positioned between the cord and the skirt, and when the arm 95 has passed the U-shaped member, the cam 220 actuates lever 222 so as to draw the U-shaped end away from the skirt, the cord portion which now lies over the U-shaped member being thereby pulled away from the skirt H by the hook and pin (227 and 228) but leaving the needle 200 remaining against the skirt. The gear 74 is of such size that it will cause three revolutions of gears 93 and the arm 95 around the bottle during the clockwise rotation of the clutch 70 so that three wraps of the cord, all under tension and therefore tight, are successively placed around the skirt and arcuate portion of needle. When the three wraps have been completed and the shuttle passes by the needle which lies against the skirt, the cam 215 is so shaped and arranged that it actuates the rack bar 206 toward the left in Fig. 11 which rotates the arcuate needle (which is now within the three cord wrappings) clockwise so that its hooked point 201 is positioned, as shown in Fig. 1, which is below the upper plane of the U-shaped end of lever 222. Simultaneously with this movement of the needle, the cam 220 permits the lever 222 to be spring actuated, so that the U-shaped end moves toward the skirt, thus positioning the cord held by hook and pin (227 and 228) between the needle hook and the wrappings around the skirt. Because of the angularly disposed surface presented by the skirt where it extends from the bead G to the bottle neck, as at I, Fig. 9, the natural tendency of each of the wrappings is to work downwardly of the bottle neck, and therefore the first wrap will be the lowest wrap. The U-shaped member having moved toward the skirt, and the lowest wrap of the cord being engaged by hook and pin (227 and 228), the cam 215 again rotatively actuates the needle 200 contra-clockwise and in so doing, the needle hook 201 engages the cord between hook 227 and pin 228.

During this time the arm 95 has, after completing the third wrap, continued its revolution and has reached a point substantially as shown in Fig. 3, which is on the opposite side of its circular path from the needle 200. The needle hook 201 having engaged the cord, which is the bottom of the three wrappings, the needle continues its arcuate counter-clockwise rotation, and in so doing, the path of the arc of the hook is sufficiently above the upper plane of the U-shaped member so that the cord is lifted clear of the pin 228, and the end engaged by the needle hook 201 is carried between the wrappings around the bottle, and the skirt, and in doing so the lowest of the wrappings loops over the outer surface of the other subsequently applied wrappings, so as to securely hold same in ring forming relation. (See Fig. 18.) At the time the needle hook commences to carry the cord end under the wrappings, the cam 195 actuates the lever 193 and thereby the lever 187 which swings the vice 184 free from the inner guide rail 181 and thus releases the leading end of the cord 104ª which has been engaged thereby, and simultaneously therewith the cam 215 again rotates the arcuate needle clockwise to disengage the needle hook 201 from the loop of the cord, and the wrappings of the cord having closed tightly against the skirt by the inherent tension exerted by the plural wrappings, the needle does not engage the wrappings on its said clockwise return movement; also the loop formed in the cord under the wrappings is frictionally held by the wrappings.

From Fig. 18 it will be noted that the return or clockwise movement of needle 200 begins prior to pulling the end 104ª of the cord completely through under the windings and thereby leaves a loop which may be released by direct pull on end 104ª. In forming this loop the lead end of the cord is passed over the last wrap and it is obvious that this loop may also be released by pulling on the severed end of the cord. Therefore, the cord may be released by direct pull on either end of the cord, which is a very important feature of this invention over any known art.

Severing the cord from its source of supply now takes place. Practically simultaneously with the forming of the frictionally held loop under the windings, the cam 253 actuates lever 250, and thereby advances the scissors 240; the handle portion 240ª of the scissors engages the stop 254 and the blades are thereby caused to close on the cord at substantially the position shown at 104ª in Fig. 8, which leaves the arm 95 at the point where a new cycle of operations begins. The finger 255 which is carried by scissor mechanism touches the end of the cord protruding from the shuttle eye 97ª and bends it downward, so it will trail in the guide 180 as above described.

When the severing operation has been completed, the bottle is lowered to the floor 22 of the frame 10 by depression of the riser plate 48, responsive to cam 32, the centering means is simultaneously disengaged from the bottle, and the bottle with the skirted cap mounted thereon is propelled out of the machine by the arm 24, so that a new bottle may be received on plate 48 and the operation repeated.

It is to be understood that the cams are so shaped and formed that they will accomplish the respective mechanical movements for which they are provided and in the chronological sequence for the efficient operation of the related mechanisms, and while it has been the endeavor to adequately and correctly indicate in the drawings preferred shapes of the cams, it is realized that changes within the range of mechanical skill may be aptly made. For rapidity of action, springs have been illustrated as preferable to reverse the action of the cam actuated levers, but mechanical skill and expediency may dictate the use of reverse cams to accomplish the desired reverse action.

At times, it is desirable to pack the capped bottles in crushed or broken pieces of ice for shipment or delivery to consumers. If the plane of the paper disc 151 is taught over the bottle top, there is danger of rupturing the disc when ice is shovelled thereon. It is therefore preferred to provide a small amount of tensional yieldability or "give" to the discs by means of a depressor 280 within cup 94 which depresses the discs centrally during the tying operation.

It is to be understood that the paper disc caps 151 may be previously formed with skirts and positioned either mechanically or manually on the bottle end in that form, and that the shearing of the flexible tie member may be manually accomplished, independent of the means to wrap the tie member around the bottle and skirt, but it is preferable to complete the entire operation mechanically as the bottle passes through the apparatus.

In the above mentioned prior Patent No. 1,762,506 to Benjamin G. Campbell, one of the co-inventors herein, a frangible seal is disclosed to releasably hold the plurality of wrappings in position circumferential of the cap skirt, and the claims herein contemplate that such a seal may be used with the present apparatus instead of frictionally holding the ends of the cord 104, although the frictional holding of the cord is preferred.

What is claimed as new and desired to be protected by Letters Patent is:—

1. An apparatus to secure a cap to a container, comprising a container support, a cap feed device adapted automatically to feed an unformed cap over an opening of the container, means to form said cap with a depending skirt circumferential of the container body, means adapted to wrap a flexible tie member a plurality of times circumferentially of the skirt of the cap, and means to engage a portion of the tie member and carry said portion between one of said wraps and said container and to thereafter release said engagement.

2. An apparatus to secure a cap to a container, comprising a container support, a cap feed device adapted for automatically feeding an unformed cap over an opening of the container, means to form said cap with a depending skirt circumferential of the container body, means adapted to wrap a flexible tie member a plurality of times circumferentially of the skirt of the cap, a device adapted to engage said container and position it during the wrapping therearound of the tie member, and means adapted to position a portion of the wrapped tie member in frictionally held relationship to the skirt of the cap.

3. An apparatus to secure a cap to a container, comprising a support for a container, means including automatically operable cap feeding and forming devices adapted to position a cap over an opening of the container with a skirt depending circumferentially of the container, means adapted to wrap a flexible tie member a plurality of times circumferentially of the skirt of the cap, a device adapted for engaging and positioning said container during the wrapping therearound of the tie member, and means to position a portion of the tie member between a portion of said wraps and said skirt in a manner which leaves said tie member releasable responsive to direct pull on either end thereof.

4. An apparatus to secure a cap to a container, comprising a support for a container, automatically operable cap feeding and forming means which are adapted for placing a cap over an opening of the container with a skirt depending circumferentially of the container body, a device adapted for providing a slack in the top of the cap which overlies the container opening, means adapted to wrap a flexible tie member a plurality of times circumferentially of the skirt of the cap, a gripping device adapted to releasably hold a lead end of said tie member during the wrapping operation, a cutter to sever said wrapped tie member from a source of supply, and means to position a portion of the tie member so that said portion is frictionally engaged by said wrappings.

5. An apparatus to secure a cap to a container, comprising a support adapted to receive a container, a driving head unit having automatically operable cap feeding and forming means which includes suction means for holding an unformed cap over an opening of the container and means to form the radially outward portion of the cap into a depending skirt circumferentially of the container body, a rotatable means adapted to wrap a flexible tie member circumferentially of the skirt of the cap a plurality of times, and means adapted to position a portion of the wrapped tie member between the wrappings thereof and the skirt of the cap in releasably held relationship to the skirt of the cap, said driving head unit being adapted for selective raising and lowering whereby containers of varying vertical dimensions may be capped.

6. An apparatus to secure a cap to a container, comprising a support adapted to receive a container, a cap feed which includes suction means for holding an unformed cap over an opening of the container, a cap forming device adapted to depress the radially outward portion of a cap circumferentially about the container body to provide a skirt, a rotatable means adapted to wrap a flexible tie member circumferentially of the skirt of the cap a plurality of times, and means adapted to position a portion of the wrapped tie member between the wrappings of the tie member and the skirt of the cap whereby said portion of the tie member may be frictionally held in a manner which leaves said tie member releasable responsive to direct pull on either end thereof.

7. An apparatus for capping containers, comprising a container support, a driving head-unit including an automatic cap feed device whereby an unformed cap is positioned over an end of the container, automatically operated means adapted to form the radially outward portion of the cap into a skirt depending circumferentially of the container body, means whereby a flexible tie member is wrapped a plurality of times circumferentially of the skirted portion of the cap, and means adapted for positioning a portion of the wrapped tie member in releasably held relationship to the skirt of the cap, said apparatus including standards on which the driving head unit is mounted and means for selectively elevating and lowering the driving head unit on said standards.

8. An apparatus for capping containers, comprising a container support, means including an automatic cap feed device and a skirt forming device whereby a skirted cap is positioned over an end of the container with the skirt depending circumferentially of the container body, means whereby a flexible tie member is wrapped a plurality of times circumferentially of the skirted portion of the cap, and means adapted to position the ends of the wrapped tie member in releasably held relationship to the skirt of the cap.

9. An apparatus for capping containers, comprising a container support, automatically operated means whereby a skirted cap is positioned over an end of the container with the skirt depending circumferentially of the container body, said last mentioned means including a cap feed and cap forming device, with the cap feed adapted to support a cap by pneumatic suction, means whereby a flexible tie member is wrapped a plurality of times circumferentially of the skirted portion of the cap, a gripping device for holding a leading portion of the tie member during the wrapping operation, a cutter to sever said wrapped tie member from a source of supply, and means adapted to position the ends of the wrapped tie member in releasably held relationship to the skirt of the cap.

10. An apparatus for capping containers, comprising a container support, means adapted to automatically feed a cap member over the container end, skirt forming means adapted to depress the radially outward portion of the cap member circumferentially of the end portion of a container to form a skirt, means whereby a flexible tie member is wrapped in a plurality of windings circumferentially of the container body exterior of said skirt while said skirt is held in its depressed position, and a device adapted to engage the container and position it against movement lateral to the container axis during the operation of placing the cap thereon.

11. An apparatus for capping containers, comprising a container support, automatically operated means whereby a disc cap member is positioned over an end of the container and other means whereby the radially outward portion of the cap member is deformed into a skirt depending circumferentially of the container body, means to wrap a flexible tie member circumferentially of the skirt of the cap, and means to position end portions of the tie member so that said end portions are frictionally and releasably held in a manner which leaves said tie member releasable responsive to direct pull on either end thereof.

12. An apparatus for capping containers, comprising a nonrotatable container support, automatically operated means whereby a disc cap member is positioned over an end of the container and other means whereby the radially outward portion of the cap member is deformed into a skirt depending circumferentially of the container body, means to wind a flexible tie member circumferentially of the skirt of the cap a plurality of times, a gripping device for holding a leading end of the tie member during the wrapping operation, means to sever said wrapped flexible member from a source of supply, and means to position end portions of the tie member so that said end portions are frictionally and releasably held in a manner which leaves said tie member manually releasable responsive to direct pull on either end thereof.

13. An apparatus for capping containers, comprising a vertically reciprocable and non-rotatable support adapted to receive a container, means to automatically feed a closure cap over an end of the container, means to vertically raise the support and container thereon whereby the radially outward portion of the closure cap is downwardly formed into a skirt depending circumferentially of the container body, a rotatable means adapted to wind a flexible tie member a plurality of times circumferentially of said skirt while the container is in raised position, means adapted to position the ends of the wrapped tie member in releasably held relationship to the skirt of the cap in a manner which leaves said tie member releasable responsive to direct pull on either end thereof.

14. An apparatus for capping containers, comprising a support adapted to receive a container, means to automatically feed a closure cap disc over an end of the container, means whereby the radially outward portion of the closure cap is downwardly formed into a skirt depending circumferentially of the container body, a rotatable means adapted to wind a flexible tie member circumferential of said skirt a plurality of times, and means adapted to position a portion of the wound tie member in a loop releasably held between a plurality of said windings and the skirt of the cap.

15. An apparatus for capping containers, comprising a support adapted to receive a container, automatic means to feed a closure cap in substantially flat form over an end of the container to be closed, means whereby the radially outward portion of the closure cap is formed into a skirt circumferentially of the container body, a rotatable means adapted to wrap a flexible tie member circumferential of said skirt a plurality of times, a gripping device for holding a leading end of the tie member during the wrapping operation, a cutter to sever said tie member from a source of supply, means adapted to position the ends of the wrapped tie member in releasably held relationship to the skirt of the cap.

16. An apparatus for winding and releasably securing a flexible member circumferential of the skirt of a cap mounted on a container end, comprising a gripping means adapted to releasably hold a leading end portion of the flexible member, means adapted to wrap the flexible member circumferential of the cap skirt a plurality of times, a curvilinear needle adapted to engage a portion of the flexible member and position said engaged portion between the cap skirt and the circumferentially wrapped portion of the flexible member so as to provide a retroverted loop, and means adapted to actuate the said needle to disengage said loop whereby said loop remains frictionally and releasably held by said wrapped flexible member.

17. A container capping device comprising the combination of automatically operated means whereby a skirted cap is positioned over an end of the container with the skirt depending circumferentially of the container body, the last mentioned means including a cap feed, a cap forming device and means to support an unformed cap responsive to pneumatic suction, a feed device for a flexible binder member whereby the flexible member may be wrapped a plurality of times circumferentially of the skirted portion of the cap, gripping means for holding a lead end of the flexible member during the wrapping operation and including means for releasing said gripping means, and a needle adapted to engage a portion of the flexible member and position said engaged portion between the cap skirt and a circumferentially wrapped portion of the flexible member and said last mentioned means being also adapted to disengage said engaged portion prior to drawing the terminal of the lead portion of the flexible member beneath the windings.

18. In a capping device having means to support a container in a position to be capped, means adapted to position a cap overlying an opening of a container with the radially outward portion of the cap depressed into a skirt externally circumferential of the container walls, said last mentioned means including feed mechanism for unformed caps, a device for forming a skirt and means for holding an unformed cap responsive to pneumatic suction, a feed for a flexible member adapted to wrap said flexible member a plurality of times circumferential of the skirt of the cap, a gripping means to releasably hold a leading end portion of the flexible member during the wrapping operation, a cutter to sever the cord from a source of supply, means adapted to engage a strand of the flexible member and position said strand between other strands and the skirt, and means adapted to release the gripping means from engagement with the held end of the flexible member.

19. In an apparatus to releasably bind a flexible member circumferentially of the skirt of a container cap, a feed device for caps including a tubular arm adapted for reciprocation to and from a position over the container opening, said arm having an opening centrally through which the end of the container may pass, said arm also having openings therein communicating with the tube therein, and one of said openings being adapted for communication with a source of air suction, and other of said openings being spaced about a face of said arm whereby a sheet of cap forming material may be picked up and held by said arm responsive to suction through said tube.

20. An apparatus to releasably bind a flexible member circumferentially of the skirt of a container closure, comprising a gripping device for holding an end portion of the flexible member, means whereby the flexible member is wrapped in a plurality of encircling windings externally of said skirt, and means adapted to engage a portion of the flexible member and carry said engaged portion between said windings and the skirt, said last mentioned means being also adapted to disengage said engaged portion prior to drawing said gripped end portion completely beneath said windings, thereby leaving said last mentioned end portion releasable by direct pull thereon.

21. In an apparatus to releasably bind a flexible member circumferentially of the skirt of a container closure, a gripping device adapted to hold a lead end portion of a flexible cord, means whereby the strand of said cord is disposed in a plurality of encircling windings externally of said skirt, a cutter adapted to sever said cord strand from a source of supply, means to release the lead end portion held by the gripping device, means adapted for engaging a portion of the cord adjacent a terminal end and carrying said engaged portion between the encircling windings and the closure skirt, and means whereby the last mentioned engaging means disengages the engaged portion of the cord prior to carrying the adjacent terminal end of the cord beneath said windings.

22. In a device for releasably securing a skirted cap over the opening of a container, means to wind a flexible member about the skirt of the container cap, a holder for a supply of caps, a cap feed device comprising a tubular cap feed arm having a suction connection, said arm having a perforated face and being adapted for swinging alternately from the cap supply holder to a position over the opening of the container to be capped, said cap supply holder having in combination therewith means to move a supply of caps into contact with the perforated face of said cap feed arm.

23. In a device of the character described which includes means for feeding, forming and tying caps over the respective open ends of a plurality of containers, a holder for a supply of caps comprising a plurality of pockets each adapted to hold a supply of caps, said pockets each having a movable bottom portion on which the supply of caps rests, the said movable bottom portions in the respective pockets being connected by a pivoted balance bar.

BENJAMIN G. CAMPBELL.
CHARLES C. WING.
GEORGE HEATH.